Oct. 18, 1960   J. H. HAUGHAWOUT   2,957,170
PULSED RADAR AUTOMATIC FREQUENCY CONTROL
Filed Nov. 19, 1956   2 Sheets-Sheet 1

INVENTOR.
John H. Haughawout,
BY
ATTORNEY

United States Patent Office 2,957,170
Patented Oct. 18, 1960

2,957,170

PULSED RADAR AUTOMATIC FREQUENCY CONTROL

John H. Haughawout, Los Angeles, Calif., assignor to Hughes Aircraft Company, Culver City, Calif., a corporation of Delaware Filed Nov. 19, 1956, Ser. No. 623,253

7 Claims. (Cl. 343—11)

This invention relates to radar automatic frequency control systems and more particularly to a dual frequency control system for pulsed and continuous wave oscillators in such systems.

In the operation of radar sets it may sometimes be desirable to receive a radar signal from another radar source or transmitter and retransmit a signal on the same frequency after a predetermined delay. Such an arrangement is very useful as a countermeasure for confusing the operation of an unfriendly radar set. Such a system may also be useful for determining frequency and range and for test purposes.

There is a problem in a system such as above defined wherein a pulsed signal is to be generated, the carrier frequency of which must be maintained at the same frequency as the carrier frequency of signals to be received nonconcurrently and never overlapping in time with the occurrence of the generated pulsed signal. It can be seen that there is thus no direct reference wave against the received signal with which the pulsed carrier frequency may be compared, since the two signals are not concurrent in time.

This invention contemplates a radar system which includes a conventional detector-mixer, an intermediate frequency amplifier and a local oscillator automatic frequency control (AFC) system but in which there is also a similar automatic frequency control for the transmitting oscillator which is referenced to a received signal and to the local oscillator so that the transmitting oscillator may be operated at exactly the same frequency as the received signal. In essence the AFC signals are derived from the receiver but are provided to control the local oscillator and the pulsed signal generating oscillator in a time sharing control circuit. In the system of this invention as in other radars the transmit and receive functions are alternative under the control of a master triggering circuit and gas tube anti-transmit-receive devices. However, the novel features of the invention involve the control of the transmitting pulsed oscillator in such fashion that despite the difference in time of occurrence of the pulsed transmitting signal and the received reference signal, the generation of the pulsed transmitting signal may be controlled by the circuits of this invention to provide a signal at the same frequency as the received reference signal.

To effect the desired result a received signal which may be either from an external source of radar signals or from the radar set's own transmitting oscillator is applied to a mixer along with the output of a local oscillator. The output of the mixer is applied to an intermediate frequency amplifier. The intermediate frequency (I.-F.) amplifier has a discriminator circuit to detect signal deviations of the resulting intermediate frequency from the center frequency of this I.-F. amplifier. The output of the discriminator circuit, a video pulse signal, is amplified and applied to a pair of AFC circuits which are operated alternately in synchronism with the receive-transmit operation of the radar system and under the normal or delayed control of appropriate triggering signals which may be derived from the received signal. When the radar, according to this invention, is in operation to receive a signal, the frequency of the received signal will result in a video pulse output signal in the AFC control circuit then in operation. The control circuits are interconnected with the master triggering circuits of the radar set so as to be initiated by them at predetermined times in the operating cycle to develop a direct-current (D.C.) voltage of a polarity and amplitude related to the deviation from center frequency of the video pulse. The D.C. voltage is applied to a frequency controlling element of the transmitting oscillator such as the repeller electrode, if the oscillator should be a reflex klystron.

The control signals are applied to the AFC circuits for both the local oscillator and transmitting oscillator in the same manner although at different times as necessitated by the system.

Accordingly, it is an object of this invention to provide, in a radar system, automatic frequency control circuits for both the local oscillator and transmitting oscillator wherein the local oscillator frequency is referenced against that of received signals, and the transmitting oscillator frequency is referenced against that of the local oscillator, the transmitting oscillator frequency being thereby referenced against that of a received signal by virtue of the referencing of the local oscillator frequency to the received signal frequency and the transmitting oscillator frequency to that of the local oscillator.

It is a further object of this invention to provide dual automatic frequency control circuits responsive to the frequency of received signals to control both the frequency of a continuous wave local oscillator and a pulsed transmitting oscillator.

It is another object of this invention to provide, in a radar system, means for generating a pulsed signal, the oscillation frequency of which is controlled by and maintained at the same frequency as signals received by the radar.

It is still another object of this invention to provide an automatic frequency control circuit for a radar system that provides a control signal for maintaining the transmitting oscillator at the same frequency as the frequency of a signal received by the radar.

These and other objects of this invention will be more clearly understood from the specification and claims which follow taken together with the drawings, in which:

Figures 1, 2:
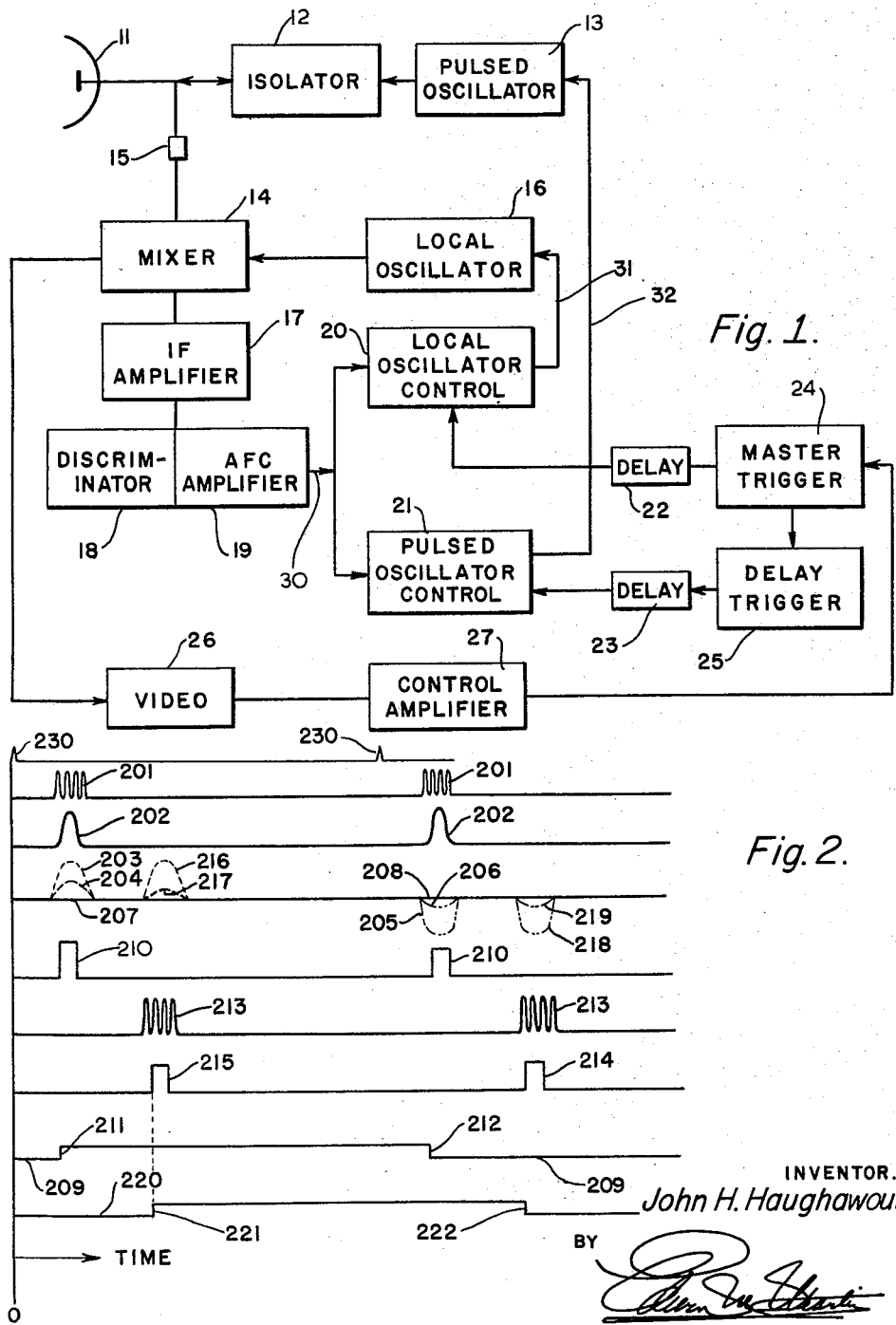
Fig. 1 is a block diagram of the system of this invention.
Fig. 2 is a chart of a series of waveforms to illustrate the operation of the invention.

Reference is now made to Fig. 1 wherein there is shown a block diagram of the essential elements of a radar system incorporating this invention. An antenna 11 is to be used in common by a transmitter portion and receiving portion of the radar. Isolator 12 is connected between the antenna 11 and a pulsed transmitting oscillator 13 and prevents received signals from entering the pulsed transmitting oscillator 13 from the antenna 11. Pulsed oscillator 13 is thus coupled to antenna 11 through isolator 12 which also prevents transmitted signals from going directly to mixer 14 at the wrong time. Mixer 14 is coupled to antenna 11 through attenuator 15. Isolator 12 and attenuator 15 each is operated to be effective alternately as described further below. A local oscillator 16 is coupled to mixer 14. Mixer 14 is coupled to an IF amplifier 17 resonant at a predetermined frequency which is the difference between the frequency of local oscillator 16 and a signal received by mixer 14 either from an attenuated output of transmitting oscillator 13 or a signal received by antenna 11. A discriminator or frequency deviation detector 18 is coupled to IF amplifier 17. An amplifier 19 is coupled to discriminator 18.

The output connection 30 of AFC amplifier 19 is divided and coupled both to a local oscillator control circuit 20 and a pulsed oscillator control circuit 21. Local oscillator control circuit 20 is coupled to local oscillator 16. Pulsed oscillator control circuit 21 is coupled by lead 32 to pulsed oscillator 13.

The input of a video amplifier 26 is coupled to the output of mixer 14. The output of video amplifier 26 is coupled to a control amplifier 27 which is coupled in turn to master trigger generator 24. Master trigger generator 24 is coupled to delay trigger generator 25, which is in turn coupled to pulsed oscillator control 21 through a delay network 23. Master trigger generator 24 is coupled through a delay network 22 to local oscillator control circuit 20. Delay networks 23 and 24 have time constants such that control circuits 20 and 21 are activated alternately in synchronism with the transmit-receive operation of the radar. The delay networks 23 and 24 together with the signals from master trigger generator 24 and delay trigger generator 25 act as a gating system for control circuits 20 and 21.

Circuit operation of the radar system of this invention as above described with respect to Fig. 1 is as follows:

A signal from an external source is received by antenna 11. This received signal may be the echo from a target object of a signal transmitted by the radar of this description as generated by pulsed oscillator 13, or it may be a signal transmitted by another radar system, or it may be a signal transmitted to the radar of this description by a test generating instrument. In any case this signal is received by antenna 11 and applied through attenuator 15 to mixer 14.

If the received signal is an echo signal of a signal transmitted by the radar system of this invention it is handled conventionally through mixer 14, IF amplifier 17 and on through discriminator 18 and AFC amplifier 19 as further described below. The transmit-receive time cycles are established by the master trigger generator 24.

If the received signal is one from an external radar system or a test generator a portion of the signal developed in mixer 14 is applied to video amplifier 26 which in turn generates a video pulse. The video pulse is applied to control amplifier 27 which in turn develops a control pulse which is applied to master trigger generator 24 and in turn develops a control pulse to initiate and control the pulses generated by master trigger generator 24 so as to be compatible with those of the external system from which the received signals are derived.

In Fig. 2, a series of waveforms with respect to time of occurrence in the system of this invention are drawn to illustrate further the operation of the system of this invention with reference to the block diagram of Fig. 1. Pulses 230 indicate the master trigger pulses of the radar system ordinarily occurring at a predetermined starting time, represented by "O" in the figure. The pulses 230 would ordinarily be generated by master trigger generator 24. Pulses 201 show a representative received signal pulse. Such a pulse is received at antenna 11 and applied to mixer 14. In response to pulses such as 201 discriminator 18 will develop pulses such as 202. If the frequency of signal 201 deviates positively or is according to an arbitrary scale, higher in frequency than the center frequency of the nominal operation frequency of the system, IF amplifier 17 will develop signals that deviate from the IF center frequency. If the frequency of the signals generated in IF amplifier 17 are exactly equal to the center frequency, the output voltage from discriminator 18 is zero as at 207 and 208. A received signal higher than center frequency as described above results in the generation of a pulse signal such as 203 or 204 by discriminator 18. A much higher than center frequency signal results in pulse 203. A little higher than center frequency results in a pulse 204. A received signal lower in frequency than center frequency produces a pulse signal as at 205 or 206 dependent upon how much lower than center frequency the signal is. Local oscillator control circuit 20 generates a sampling pulse as shown at 210 during which time the amplitude and polarity of pulses such as 203, 204, 205, 206, 207 or 208 are detected, and an appropriate control pulse of appropriate polarity and amplitude generated when there is a deviation from center frequency. A repeller controlled klystron such as shown at 31 in Fig. 3 may form the local oscillator 16. Its operation is more fully described below. The waveforms 209 represent a quiescent value of repeller voltage at which the klystron 31 may be operated. When a pulse signal such as 203 or 204 is developed in discriminator 18, by the operation of control circuit 20, as further described below, correction signals are developed which create an appropriate shift in repeller voltage. The correction signal is shown at 211 to indicate the voltage change which results in a shift in the klystron oscillation frequency. When an error signal such as 205 or 206 is detected an opposite voltage shift is generated as shown at 212.

Where the received signal 201 is one which is derived from a source such as an external radar set or a test signal generator the frequency of the pulsed transmitting oscillator must be referenced with respect to the received signal. Therefore the transmitted signal occurs later in time with respect to the received signal. The pulses 213 illustrate the operating frequency pulse of the pulsed oscillator. If the pulsed oscillator frequency pulse as 213 does not have the same frequency as that of the received signal, there is developed in the IF channel 17 a signal which results in error pulses being generated by discriminator 18 as at 216, 217, or 218, 219. These error pulses are sampled by control circuit 21 as shown by sampling pulses such as 215 or 214, respectively to produce repeller voltage corrections to pulsed oscillator 13 as shown at 221 and 222 to bring the frequency of operation of pulsed oscillator 13 to its correct and desired frequency.

In the general operation of the system of this invention conventional elements of a radar system are employed for the antenna 11, mixer 14, isolator 13, and attenuator 15 and IF amplifier 17. The discriminator 18 is of a conventional type and AFC amplifier 19 is of a conventional D.C. amplifier configuration. Particularly novel aspects of this invention are found in the time sharing use of control circuits 20 and 21 for which the details are found in Fig. 3 to which reference is made below. In other words, time sharing occurs because the discriminator 18 is used to continuously supply error pulses to both control circuits 20 and 21 which then successively control the oscillators 16 and 13 respectively. The gating action is effected by means of the delay circuits 22 and 23 as previously described.

Figure 3:
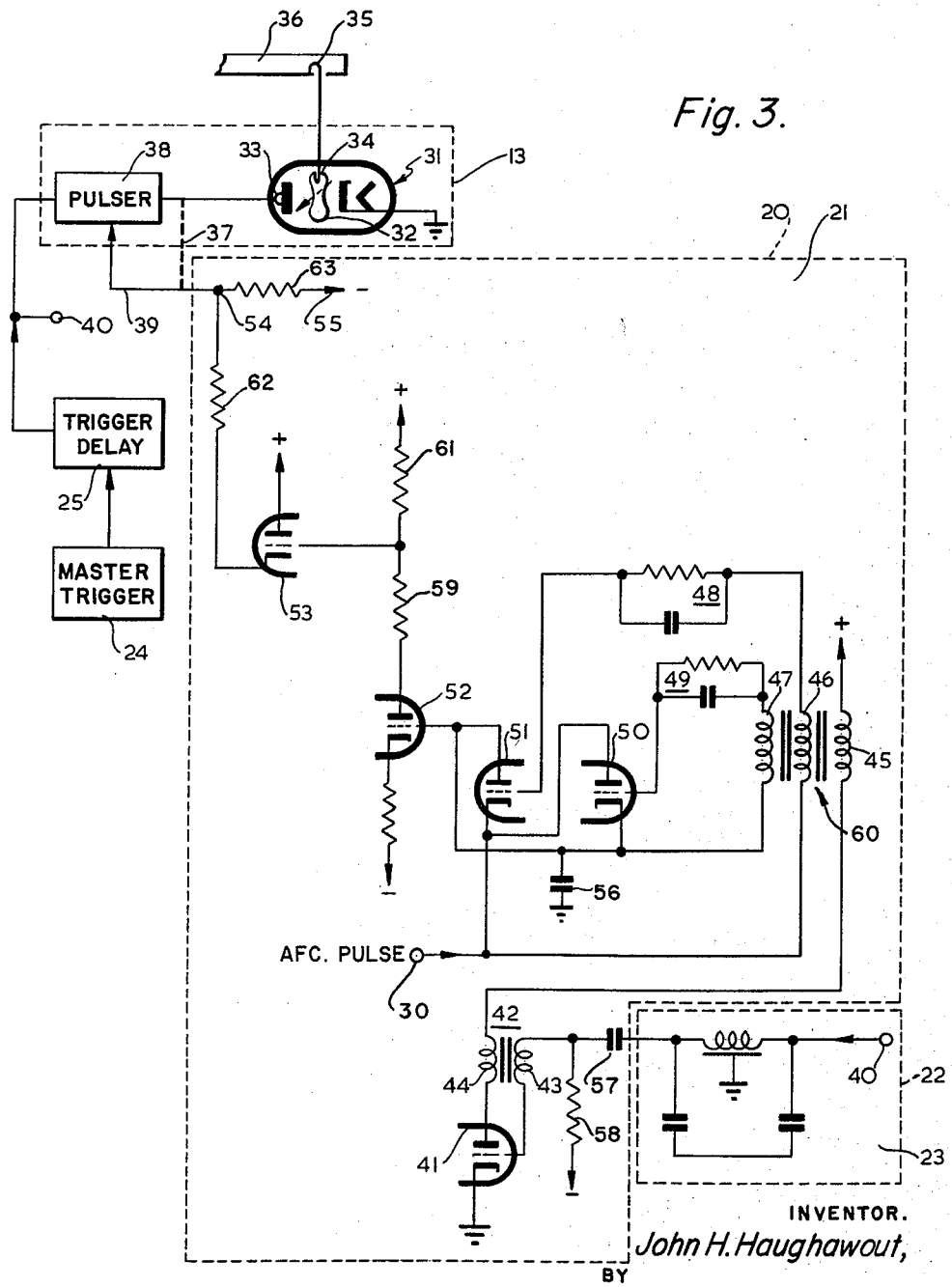
Fig. 3 is a simplified schematic circuit diagram of a portion of Fig. 1 showing one form of an automatic frequency control circuit according to this invention.

Oscillator 31 in Fig. 3 is a schematic representation of klystron which may be employed as either the pulsed oscillator 13 of the block diagram of Fig. 1 or the local oscillator 16 thereof. Klystrons of this type are capable of frequency adjustment by the dimensional variation of the cavity 32 or by the D.C. voltage applied to the repeller 33. The oscillation frequency output of the klystron is obtained through a coupling loop 34 in cavity 32 which in the example shown is connected by a similar loop 35 into a transmission cavity or waveguide 36. Transmission cavity 36 may be connected to isolator 12 of Fig. 1 if oscillator 31 is used as pulsed oscillator 13 of Fig. 1. Transmission cavity 36 may be connected to mixer 14 if the oscillator 31 is used as local oscillator 16 of Fig. 1.

Klystrons may be quiescent at one repeller potential while at some other potential the klystron becomes an oscillator. This property of klystrons makes it possible to pulse control a klystron so that it is alternately in its oscillation state or its quiescent state. At any one potential at which oscillation occurs, small variations in the repeller potential may be made to change the frequency.

As a continuous wave oscillator for local oscillator service such as that used in block 16 of Fig. 1 control circuits corresponding to block 20 of Fig. 1, and as more specifically described below, are connected directly to repeller 33 of klystron 31 by the dashed connecting line 37 shown in Fig. 3. When the klystron 31 is used as a pulsed oscillator then repeller 33 is connected to a pulser circuit 38 in which instance the control circuit of Fig. 3 as described below now corresponds to block 21 of Fig. 1. The control circuit in the latter arrangement then is coupled to repeller 33 through pulser circuit 38. Pulser circuit 38 and oscillator 31 combined correspond to block 13 of Fig. 1. Pulser 38 is connected through a delay trigger 25 to master trigger circuit 24.

Referring now in detail to the dashed-in blocks of Fig. 3 note that they have been identified at 20 with dashed lead line and 21 with solid lead line respectively and 22 with dashed lead line and 23 with solid lead line respectively. In Fig. 1, 22 and 20 indicate the local oscillator delay and control circuits respectively and 23 and 21 are the pulsed oscillator delay and control circuits respectively. Within the dashed-in blocks both circuits, that is 20/21 and 22/23 are basically identical and are to be so considered in the following description. Any differences are merely in the values of the components. The circuit configurations are identical. Therefore with respect to the description below, portions of the circuits shown in Fig. 3 may be considered to be either of block 20 or block 21.

The circuit within the dashed block 20/21 is generally known as a keyed or pulsed bi-directional peak detector. A tube 41 is connected as a blocking oscillator having a blocking oscillator transformer 42. Transformer 42 has a primary 43 connected at one terminal to the grid of tube 41 and at its other terminal through a coupling capacitor 57 to the delay network 22/23. Resistor 58 is coupled between the junction of primary winding 43 with capacitor 57 and a source of negative potential (—). The input circuit 40 of delay network 22/23 would normally be connected to either the delay trigger circuit 25 or to the master trigger circuit 24 (see Fig. 1) for local oscillator or pulsed oscillator control, as the case may be. Pulses, as delayed by delay network 22/23, trigger blocking oscillator 41.

The secondary winding of blocking oscillator transformer 42 is coupled by one of its terminals to the anode of tube 41 and by its other terminal to a primary winding 45 of a detector coupling transformer 60. The other end of primary winding 45 is coupled to a source of positive (+) potential. Tubes 50 and 51 comprise the peak detector previously mentioned. Secondary winding 46 of transformer 60 is coupled by one of its terminals to the cathode of tube 51 and by its other terminal through charge-storage circuit 48 to the grid of tube 51. The tertiary winding 47 of transformer 60 is coupled by one of its terminals to the cathode of tube 50 and by the other terminal through charge storage circuit 49 to the grid of tube 50. The anode of tube 50 is connected to the cathode of tube 51. The anode of tube 51 is connected both to the cathode of tube 50 and to the grid of a D.C. amplifier 52. A charge storage capacitor 56 is connected between the grid of D.C. amplifier 52 and ground. An input connection 30 is made to the junction of the cathode of tube 51 and anode of tube 50 for supplying an AFC pulse. This connection (30) corresponds to the identically numbered lead line of Fig. 1.

The anode of D.C. amplifier 52 is coupled to the grid of a cathode follower D.C. amplifier 53. The cathode of D.C. cathode follower amplifier 53 is coupled through resistor 62 to a junction 54 between a resistor 63 and lead line 39 which is the coupling connection between block 21 and pulser 38. Alternatively the junction 54 is connected with dashed line 37 representing the coupling between block 20 and the repeller electrode 33 of klystron 31.

The operation of the pulsed bidirectional detector is as follows with reference to Fig. 3.

Blocking oscillator 42 is triggered by pulses from the master trigger system such as 25 after a time delay by delay network 22/23. The timing of the operation of the blocking oscillator 42 is thereby delayed to produce a sampling pulse such as 210 or 215 (see Fig. 2) which occurs at about the center of the occurrence of the received pulse 201 or 213 as the case may be. The sampling pulse appears in winding 45 of transformer 60 and is coupled over to windings 46 and 47, and is impressed through charge networks 48 and 49, to the grids of tubes 50 and 51 to render the grid-to-cathode paths of tubes 50 and 51 conductive.

If no AFC signal is present at input terminal 30 (Fig. 3) the tubes 51 and 50 are cut off by the grid leak action of networks 48 and 49 shortly after the occurrence of the blocking oscillator sampling pulse. Capacitor 56 receives a nominal charge at this time which is retained until the next sampling pulse arrives. If during the occurrence of the sampling pulse an AFC pulse such as 203 or 204 (see Fig. 2) is present it appears at the cathode of tube 51 and anode of tube 50. If the AFC pulse is more positive than the charge on capacitor 56 or more positive than the last AFC pulse that had been detected, then the anode of tube 50 is more positive than its cathode and the cathode of tube 51 more positive than its anode. Tube 50 therefore remains conductive to increase the charge on capacitor 56 and tube 51 will conduct. The increase in the charge on capacitor 56 increases the value of grid potential appearing on the grid of D.C. amplifier 52 causing amplifier 52 to conduct. Consequently a drop in potential at the grid of D.C. cathode follower amplifier 53 occurs to result in a new level of potential at repeller 33 as shown at 211 or 221 in Fig. 2 to change the oscillation frequency of klystron 31 (Fig. 3).

If the AFC pulse is more negative than the preceding pulse as shown at 205 or 206 (Fig. 2) or more negative than the charge appearing on capacitor 56 a series of changes occurs in the opposite direction resulting in an opposite change in the potential of repeller 33 of klystron 31 as shown at 212 or 222 of Fig. 2. Thus depending on the polarity of, and the amplitude difference between successive AFC pulses sampled, the frequency of oscillation of klystron 31 is made to change so as to result in no AFC pulse at all as at 207 in Fig. 2 in which event the klystron oscillation frequency remains constant.

Where the control circuit shown in Fig. 3 corresponds to block 21 of Fig. 1 the klystron repeller potential correction pulse, when generated by circuit 21, is added to or subtracted from the pulsing potential generated by pulser 38. The correction signal is applied to pulser 38 through lead 39.

Where the control circuit shown in Fig. 3 corresponds to block 20 of Fig. 1 the klystron repeller potential correction pulse where generated by circuit 20 is added to, or subtracted from, the directly applied klystron repeller potential as derived from a source connected to terminal 55 of Fig. 3. The connection signal is applied directly to repeller 33 through the connection 37 shown in Fig. 3 as previously described in detail.

The control circuit 20 and the control circuit 21 are operated alternately by the master trigger circuit 24 through the action of delay network 22 to the local oscillator control 20 and delay trigger network 25 and delay network 23 to the pulsed oscillator control 21 so that the AFC pulse being received through line 30 by either control circuit 20 or control circuit 21 is coincident with the receive or transmit operation respectively of the radar system. Therefore, as may be seen with reference to Fig. 2, when, by the operation of the circuits 20 and 21 an AFC pulse such as 203 is present during a sampling period shown by pulse 210 a correction voltage as shown at 211 is developed to adjust the transmitter oscillator repeller voltage to a new level from its previous level 209. Subsequently the local oscillator repeller voltage changes as at 221 from its prior level 220 to follow the transmitter oscillator repeller voltage. The change in local oscillator repeller voltage results from the detection of error pulse 216 during the sampling period indicated by pulse 215.

Thus it may be seen that if by way of example a radar system according to this invention has a 40 mc. intermediate frequency the local oscillator would nominally be operated at 40 megacycles below the transmitted frequency. However, should a signal be received at a frequency slightly different from the transmitted frequency, the transmitter oscillator would first be corrected to a new transmitting frequency to correspond with the received frequency and the local oscillator thereafter corrected to maintain its frequency at the proper IF value different from the new transmitted frequency.

Accordingly, if the radar system is one under test it could be made to follow signals presented to it from an external source and to transmit at the same frequency as that of the signals directed to it.

What is claimed as new is:

1. In a radar system having a pulsed transmitting oscillator, a continuous wave local oscillator, a master trigger generator, a radar receiver, and an intermediate frequency amplifier having a predetermined center frequency, a dual automatic frequency control for the oscillators comprising: a frequency deviation detector coupled to the intermediate frequency amplifier and adapted to generate pulses of a polarity and amplitude representative of the deviation of signals developed by the intermediate frequency amplifier from the center frequency thereof; a first automatic frequency control signal generator coupled between the pulsed transmitting oscillator and said frequency deviation detector; a second automatic frequency control signal generator coupled between the local oscillator and said frequency deviation detector; and gating circuits coupled between the master trigger generator and each of said automatic frequency control signal generators to alternately energize said automatic frequency control signal generators whereby frequency control signals are applied respectively to the transmitting oscillator and the local oscillator.

2. The dual automatic frequency control system for oscillators defined in claim 1, wherein said gating circuits comprise a first delay network having a first predetermined time delay characteristic coupled between said master trigger generator and said first automatic frequency control signal generator; and a second delay network having a second predetermined time delay characteristic coupled between said master trigger generator and said second automatic frequency control signal generator, whereby said gating circuit provides master trigger signals alternatively to said first and said second automatic frequency control signal generators to direct their operation alternately at first and second predetermined times respectively corresponding to said delay characteristics of said delay networks.

3. A radar system comprising: a pulsed transmitting oscillator, a continuous wave local oscillator; a master trigger generator; a radar receiver; an intermediate frequency amplifier having a predetermined center frequency; and a dual automatic frequency control for the oscillators including a frequency deviation detector coupled to the intermediate frequency amplifier and adapted to generate pulses of a polarity and amplitude representative of the deviation of signals developed by the intermediate frequency amplifier from the center frequency thereof, a first automatic frequency control signal generator coupled between the pulsed transmitting oscillator and said frequency deviation detector, a second automatic frequency control signal generator coupled between the local oscillator and said frequency deviation detector, and gating circuits coupled between the master trigger generator and each of said automatic frequency control signal generators to alternately energize said automatic frequency control signal generators whereby frequency control signals are applied respectively to the transmitting oscillator and the local oscillator.

4. A radar system comprising: a pulsed transmitting oscillator, a continuous wave local oscillator; a master trigger generator; a radar receiver including a video pulse detector; a video amplifier coupled between said video pulse detector and said master trigger generator for applying video pulses to said master trigger generator, an intermediate frequency amplifier having a predetermined center frequency, a dual automatic frequency control for the oscillators comprising: a frequency deviation detector coupled to the intermediate frequency amplifier and adapted to generate pulses of a polarity and amplitude representative of the deviation of signals developed by the intermediate frequency amplifier from the center frequency thereof; a first automatic frequency control signal generator coupled between the pulsed transmitting oscillator and said frequency deviation detector; a second automatic frequency control signal generator coupled between the local oscillator and said frequency deviation detector; and gating circuits coupled between the master trigger generator and each of said automatic frequency control signal generators and responsive to pulses of said master trigger generator to alternately energize said automatic frequency control signal generators whereby frequency control signals are applied respectively to the transmitting oscillator and the local oscillator to maintain the frequency of said local oscillator at a predetermined frequency with respect to the frequency of received signals and to maintain the frequency of said transmitting oscillator to correspond with the frequency of signals received by said receiver.

5. A dual frequency control system for radars comprising: a radar transmitter including a pulsed oscillator for developing pulsed waves at a first predetermined frequency; a superheterodyne radar receiver including a local oscillator for developing an oscillating wave at a second frequency having a predetermined difference in frequency from said first predetermined frequency, an antenna coupled to both said receiver and said transmitter; a frequency deviation detector coupled to said radar receiver and adapted to develop pulses having a polarity and amplitude representative of any deviation in frequency from said first predetermined frequency exhibited by signals received by said antenna and applied to said receiver; a pulsed oscillator control circuit and a local oscillator control circuit, both being coupled to said frequency deviation detector; and trigger circuit means coupled to said pulsed oscillator control circuit and said local oscillator control circuit for selectively and alternatively rendering said circuits responsive to said pulses of said deviation detector to develop correction pulses, whereby the frequency of said pulsed oscillator may be corrected to transmit the pulsed waves at the same frequency as that of said received signals, and whereby the frequency of said local oscillator may be maintained at said predetermined difference in frequency from that of said pulsed waves.

6. A dual frequency control system for radars comprising: a radar transmitter including a pulsed oscillator for developing pulsed waves at a first predetermined frequency; a superheterodyne radar receiver including a local oscillator for developing an oscillating wave at a second frequency having a predetermined difference in frequency from said first predetermined frequency, and a separate detector for developing video control pulses corresponding to the pulse repetition frequency of signals received by said receiver, an antenna coupled to both said receiver and said transmitter; a frequency deviation detector coupled to said radar receiver and adapted to develop pulses having a polarity and amplitude representative of any deviation in frequency from said first predetermined frequency exhibited by signals received by said antenna and applied to said receiver; a pulsed oscillator control circuit and a local oscillator control circuit, both being coupled to said frequency deviation detector; and trigger circuit means coupled to said pulsed oscillator control circuit and said local oscillator control circuit and to said separate detector and being responsive to said video control pulses for selectively and alternatively rendering said circuits responsive to said pulses of said deviation detector to develop correction pulses, whereby the frequency of said pulsed oscillator may be corrected to transmit the pulsed waves at the same frequency as that of said received signals, and whereby the frequency of said local oscillator may be maintained at said predetermined difference in frequency from that of said pulsed waves.

7. A dual frequency control system for a pulsed transmitting oscillator and a continuous wave local oscillator of a radar system comprising: receiving means including a continuous wave local oscillator; transmitting means including a pulsed transmitting oscillator; first control circuit means coupled between said receiving means and said local oscillator; and second control circuit means coupled between said receiving means and said pulsed transmitting oscillator, both of said control means including circuits responsive to signals received by said receiving means to develop control signals when said signals received by said receiving means are different in frequency from the frequency of the wave developed by said pulsed transmitting oscillator, whereby said control signals are applied to said transmitting oscillator to maintain said oscillator at the same frequency as that of said received signal and to said local oscillator to continuously maintain said local oscillator at a predetermined difference frequency with respect to that of said transmitting oscillator.

No references cited.